United States Patent [19]

Kuzumoto et al.

[11] Patent Number: 4,785,458
[45] Date of Patent: Nov. 15, 1988

[54] GAS LASER DEVICE

[75] Inventors: Masaki Kuzumoto, Kawanishi; Shigenori Yagi, Amagasaki; Shuji Ogawa, Nishinomiya; Koji Yasui, Itami, all of Japan

[73] Assignee: Mitsubishi Denki Kabushiki Kaisha, Tokyo, Japan

[21] Appl. No.: 699,126

[22] Filed: Feb. 7, 1985

[30] Foreign Application Priority Data

Feb. 13, 1984 [JP] Japan .................................. 59-24705
Feb. 24, 1984 [JP] Japan .................................. 59-33656
Sep. 19, 1984 [JP] Japan .................................. 59-196313

[51] Int. Cl.⁴ ........................ H01S 3/22; H01S 3/223
[52] U.S. Cl. ...................................... 372/58; 372/61; 372/83
[58] Field of Search ................. 372/56, 55, 58, 61, 372/83

[56] References Cited

U.S. PATENT DOCUMENTS 4,085,385  4/1978  Fein et al. ........................ 372/56
4,245,194  1/1981  Fahlen et al. ..................... 372/58
4,329,662  5/1982  Yagi .................................... 372/38
4,417,342  11/1983 McKee ................................ 372/86
4,618,961  10/1986 Sutter ................................. 372/83

FOREIGN PATENT DOCUMENTS 2119443  11/1983  United Kingdom .

Primary Examiner—William L. Sikes
Assistant Examiner—Robert E. Wise
Attorney, Agent, or Firm—Oblon, Fisher, Spivak, McClelland & Maier

[57] ABSTRACT

A gas laser device comprises a discharge tube made of a dielectric material; a laser medium gas which is circulated at a high speed within the discharge tube in the axial direction of the discharge tube; an optical resonator composed of a total reflection mirror and a partial reflection mirror, both being disposed in mutual confrontation at both ends of the discharge tube; a plurality of electrodes oppositely provided on the outer periphery of the discharge tube; and a power source for applying an a.c. voltage to the oppositely provided electrodes to generate silent discharge.

36 Claims, 5 Drawing Sheets

GAS LASER DEVICE

This invention relates to a gas laser device, and, more particularly, it is concerned with an improvement in the laser excitation system in an axial flow type gas laser device as well as an improvement in the construction of such gas laser device.

As a typical gas laser device of this sort, there has so far been known one as shown in FIG. 1 of the accompanying drawing. This figure of drawing is a schematic structural diagram of the conventional DC (direct current) glow discharge excitation type high speed axial flow $CO_2$ gas laser device. In the drawing, a reference numeral 1 designates a discharge tube, a numeral 11 refers to an anode, a numeral 12 denotes a cathode, a reference numeral 13 represents glow discharge to be generated in the discharge tube 1, 14 refers to a nozzle, 100 a DC (direct current) power source, 2 a Roots blower (an air blower), 3 a heat exchanger, 4 a total reflection mirror, 5 a partial reflection mirror, 6 a vacuum pump, 7 a gas recycle device, 8 a laser gas bomb, 9 an air feeding pipe, and 10 a direction of gas current.

In the following, explanations will be made as to the operations of the conventional DC glow discharge excitation type high speed axial flow $CO_2$ gas laser device shown in FIG. 1. The laser discharge tube 1 of a laser oscillator is filled in its interior with a laser medium gas consisting of $CO_2$, $N_2$, He, and other gases in mixture under a gas pressure of about a few ten Torr or about several tens of Torr. $CO_2$ molecules are excited by applying a d.c. voltage of about several tens of kilo volts across the anode 11 and the cathode 12 to thereby generate the glow discharge 13 in the discharge tube 1. Here, the nozzle 14 plays a role of reducing loss in the gas pressure and stabilizing the glow discharge 13. The $CO_2$ molecules excited by the glow discharge 13 bring about the laser oscillation in an optical cavity (resonator) constructed with the total reflection mirror 4 and the partial reflection mirror 5, and a part of the laser beam is taken outside through the partial reflection mirror 5. In this type of the gas laser device, the laser medium gas is usually circulated by the Roots blower 2 in the discharge tube 1 at a high speed of about 50 m/s or more, more specifically 200 m/s or around this figure, to thereby suppress increase in the gas temperature. Also, it is so designed that the gas temperature may be kept low by means of the heat exchanger 3. In the gas seal-off operation, ions are discharged from the metal electrodes such as the anode 11, the cathode 12, and so forth, on account of which the gas is deteriorated to decrease the laser output. In order, therefore, to prevent such decrease in the laser output, purity of the gas is so maintained at a substantially constant value by means of the vacuum pump 6, the gas recycle device 7, the laser gas bomb 8, and so forth, through which a part of the laser medium gas is discarded, another part thereof is regenerated, and still another part thereof is replenished.

Since the conventional DC glow discharge exitation type high speed axial flow $CO_2$ gas laser is constructed in the manner as described in the foregoing, the metal electrodes such as the anode 11, the cathode 12 are positioned in the high speed gas current, hence the device has such disadvantages to be enumerated in the following.

(1) The gas pressure loss increases and the gas flow rate decreases, whereby the gas temperature goes up.

(2) The discharge condition depends largely on the shape of the nozzle 14 and the metal electrodes such as the anode 11, the cathode 12, whereby fluctuation in their shape considerably affect the laser output and the laser beam mode.

(3) Owing to the ion discharge from the metal electrodes such as the anode 11, the cathode 12, as well as abnormal discharge ascribable to such ion discharge, the laser gas intensely deteriorates to make it necessary to provide the gas recycle device 7.

Besides the above, the following various disadvantages are accompanied by the conventional gas laser device.

(4) A stabilizing action (by the bipolar diffusion) of the discharge at the wall surface of the discharge tube 1 is necessary, the operation of which is impossible with the discharge tube 1 of an arbitrary diameter.

(5) In order to obtain the discharge in the direction 10 of the high speed gas current, (i) an electrode distance d between the anode 11 and the cathode 12 becomes long with the consequence that a high tension of about several tens of kilo volts is required to be applied across the electrodes; and (ii) a charge region by the charged particles flowing in the discharge space in the same direction as that of the high speed gas current (the direction 10) becomes extremely lengthy; as the consequence of this, an insulation distance is required to be long.

(6) In order to suppress rise in the gas temperature of the laser medium gas, it is an effective way to increase a mass flow by increase in a gas pressure p, and it is also an essential requirement to increase the gas pressure p even in the gas seal-off operation. On the other hand, a value of pd, which is a product of the gas pressure p and the electrode distance d, is an index showing the stability in the discharge. From these facts, if and when the abovementioned value of pd reaches a certain critical value or above, the electric discharge becomes unstable, on account of which, when the electrode distance d becomes long, as already mentioned in the above paragraph (5), it is no longer possible to increase the gas pressure p to a certain level or above, hence the gas laser device can only be used in a gas pressure range of about 50 Torr or below.

(7) It might happen that the glow discharge 13 shifts to an arc discharge under the influence of a residual charge, hence, in a pulse discharge, the pulse period thereof cannot be made shorter than a time for the discharge to pass through a gas discharge section.

In view of the above-described various disadvantages inherent in the conventional gas laser device, the present invention has been made with an aim at providing an improved gas laser device capable of obtaining a stable and uniform discharge.

It is another object of the present invention to provide an improved gas laser device which has been made compact in size as a whole.

It is still another object of the present invention to provide an improved gas laser device which is capable of lowering the discharge initiating voltage so as to readily perform control of the main discharge power.

It is other object of the present invention to provide an improved gas laser device comprising a plurality of discharge tubes, in which fluctuation in the discharge in each and every discharge tube is made as small as possible at the start of the discharge.

It is still other object of the present invention to provide an improved gas laser device which is capable of realizing the electric discharge with a high power density.

According to the present invention, in general aspect of it, there is provided a gas laser device, which comprises in combination: a discharge tube made of a dielectric material; a laser medium gas which is circulated at a high speed within said discharge tube in the axial direction of the discharge tube; an optical resonator composed of a total reflection mirror and a partial reflection mirror, both being disposed in mutual confrontation at both ends of said discharge tube; a plurality of electrodes oppositely provided on the outer periphery of said discharge tube; and a power source for applying an a.c. voltage to said oppositely provided electrodes to generate silent discharge.

The foregoing objects, other objects as well as specific construction and operations of the gas laser device according to the present invention will become more apparent and understandable from the following detailed description of several preferred embodiments thereof, when read in conjunction with the accompanying drawing.

In the following, the present invention will be described in detail with reference to the preferred embodiments thereof shown in the accompanying drawing.

Figure 1:
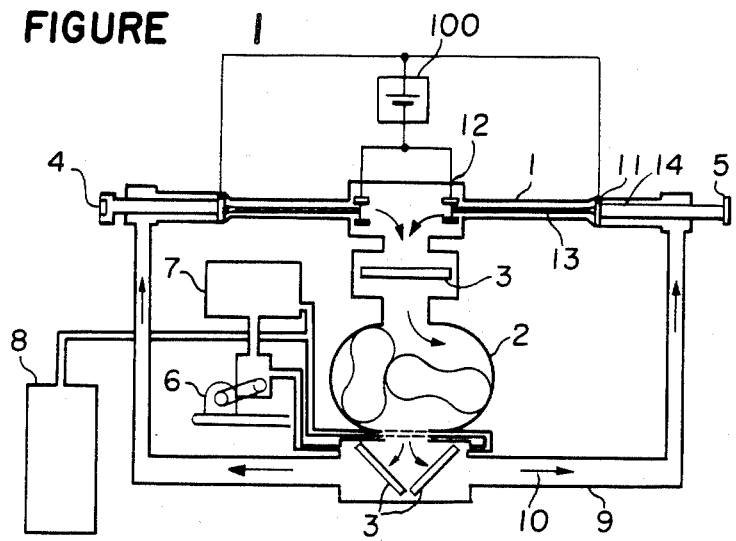
FIG. 1 is a schematic structural diagram showing a conventional d.c. glow discharge excitation type high speed axial flow $CO_2$ gas laser device.
Figure 2A:
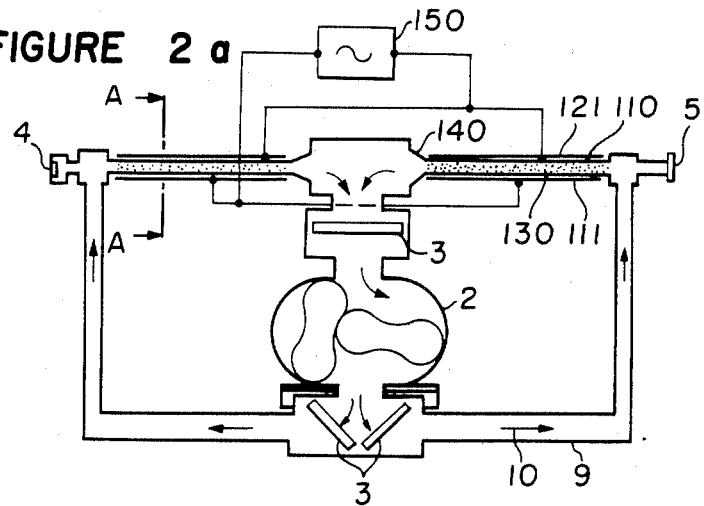
FIGS. 2A and 2B are respectively a schematic structural diagram showing a silent discharge type high speed axial flow $CO_2$ gas laser device according to one embodiment of the present invention, and a cross-sectional view taken along a line A—A of the discharge tube of the gas laser device.
Figure 2B:
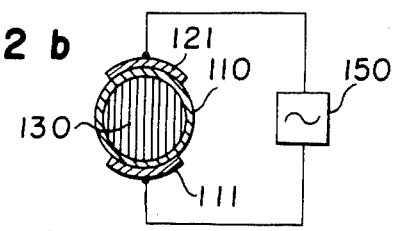

First of all, reference will be had to FIGS. 2A and 2B respectively showing a schematic structural diagram showing a silent discharge type high speed axial flow $CO_2$ gas laser device as one embodiment of the present invention, and a cross-sectional view taken along a line A—A of the discharge tube of the gas laser device. It should be noted that those parts which are identical with those in FIG. 1 will be designated by the same reference numerals, and the detailed explanations thereof will be dispensed with.

In FIGS. 2A and 2B, a reference numeral 110 designates the discharge tube made of a dielectric material such as glass, ceramic, titanium oxide, and so forth; numerals 111 and 121 refer to a plurality of metal electrodes oppositely provided on the outer periphery of the discharge tube 110; a reference numeral 150 denotes a high frequency power source connected to each of the metal electrodes 111 and 121; a numeral 130 indicates the silent discharge generated in the discharge tube 110; and a numeral 140 refers to a diffuser nozzle.

In the next place, explanations will be given as to the operations of the silent discharge type high speed axial flow $CO_2$ gas laser device as one embodiment of the present invention shown in FIG. 2. Within the discharge tube 110 of a laser oscillator, a laser medium gas composed of $CO_2$, $N_2$, He and other gases in mixture is filled under a gas pressure of about 100 Torr. When a high frequency voltage having a frequency of, for example, about 100 KHz and a zero peak of about 5 KV is applied to each of the metal electrodes 111 and 121 from a high frequency power source 150, an a.c. discharge, or the so-called silent discharge 130, is generated in the discharge tube 110 through the dielectric material constituting the same, whereby the $CO_2$ molecules are excited. The $CO_2$ molecules excited by the above-mentioned silent discharge 130 bring about the laser oscillation within the optical cavity constructed with the total reflection mirror 4 and the partial reflection mirror 5, from which a part of the laser beam is taken outside through the partial reflection mirror 5. The laser medium gas is cooled by the heat exchanger 3, and circulated at a high speed within the discharge tube 110 by means of the Roots blower 2. Here, in order to reduce the gas pressure loss of the laser medium gas in the diffuser nozzle 140 forming an enlarged flow path section of the discharge tube 110, the diffuser nozzle 140 is constructed to have its angle of expansion of about 20 degrees.

As described in the foregoing, the silent discharge type high speed axial flow $CO_2$ gas laser device according to one embodiment of the present invention has no metal electrodes 111 and 121 disposed in the high speed gas current, hence it has various features to be enumerated in the following.

(1) No gas pressure loss is brought about by each of the metal electrodes 111 and 121, and the gas flow rate can be easily increased.

(2) No change is caused to the electric discharge on account of the shape of the diffuser nozzle 140 and each of the metal electrodes 111 and 121.

(3) Substantially no deterioration of the laser medium gas takes place owing to the ion discharge from the metal electrodes 111 and 121, hence there is no necessity for providing the gas regeneration device such as the vacuum pump 6, the gas recycling device 7, etc. as shown in FIG. 1.

(4) In addition to the effect of the increased flow rate of the high speed laser medium gas as mentioned in the preceding paragraph (1), the electric discharge is much more stabilized by the capacitive ballast effect of the dielectric material constituting the discharge tube 110, whereby the operation of the gas laser device is made possible with the discharge tube 110 of an arbitrary diameter. That is to say, even if a local discharge concentration occurs in one part of the discharge space within the discharge tube 110, such discharge concentration is promptly inhibited self-controllably by a reverse electric field of accumulated charge on the surface of the dielectric material with the consequence that the discharge space becomes homogeneous and the transition from the glow discharge 13 to the arc discharge does not occur to the substantial extent.

(5) Since the discharge is in the direction which intersects orthogonally with the gas current, (i) the distance d between the metal electrodes 111 and 121 is shortened, and the applying voltage is sufficient with a relatively low a.c. voltage of about 5 KV, and (ii) since the directions of the alternating current discharge and the gas current orthogonally intersect each other, the charging distance at the down stream side of the gas current becomes short: as the consequence of the above-mentioned points (i) and (ii), the insulation distance can be designed short.

(6) As mentioned in the preceding paragraph (5), since the distance d between the electrodes is short, the gas pressure p can be increased from the standpoint of the value pd which is the product of the gas pressure p and the electrode distance d, and the mass flow can also be increased, hence the gas seal-off operation can be done easily.

(7) Owing to the capacitive ballast effect as mentioned in the above paragraph (4), the pulse frequency in the pulse discharge can be increased to the physical limit of the laser medium gas (i.e., a relaxation time of the upper level of the laser) without being influenced by the residual charge.

By the way, in the above-described embodiment, explanations have been given as to the case of the $CO_2$ gas laser device using the laser medium gas composed of $CO_2$, $N_2$, He, and other gases in mixture. It should, however, be noted that, besides the abovementioned gas laser device, other type of the gas laser device may also be employed with the same effect as the above-described embodiment.

The embodiment device shown in FIG. 2 is so constructed that the silent discharge is adopted as the discharge for exciting the laser medium gas of the gas laser device, in which an alternating current voltage is applied to a plurality of electrodes oppositely disposed on the outer periphery of the discharge tube to bring about the electric discharge, to thereby eliminate the electrodes from the high speed gas current in the discharge tube and shorten the distance between electrodes. As the consequence of this, there may be exhibited excellent effects such that (i) the gas flow rate can be easily increased, and the rise in the gas temperature can be suppressed; (ii) the gas seal-off operation is rendered possibly with the consequence that the gas regenerating device such as the gas recycling device, and so on is no longer necessary; (iii) the insulation distance can be shortened, whereby the gas laser device as a whole can be made compact in size; (iv) the discharge is effected with good stability, whereby the gas laser device of extremely high reliability can be obtained; and various other advantages.

Figure 3:
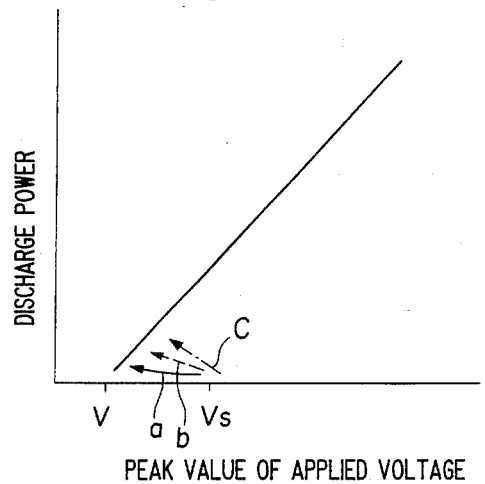
FIG. 3 is a graphical representation showing a relationship between a voltage applied across the electrodes and a discharge power in the embodiment of FIG. 2.

It should be noted here in connection with the embodiment shown in FIG. 2 that the discharge has to be initiated readily. More specifically, in the embodiment shown in FIG. 2, when the laser beam is to be obtained by application of a high frequency, high electric potential across the metal electrodes 111 and 121, the discharge power changes as shown in FIG. 3 with respect to changes in voltage to be applied across the electrodes 111 and 121. As is apparent from FIG. 3, since the interior of the discharge tube 110 takes nearly a uniform field, the discharge is initiated as soon as the voltage applied across the electrodes 111 and 121 reaches a considerably large voltage value $V_s$. There is also a problem such that, since the applying voltage in the vicinity of the voltage $V_s$ at the start of the discharge contains therein the discharge initiating process at every cycle, fluctuations occur in the discharge power as shown by reference letters (a), (b) and (c) in FIG. 3, whereby the discharge power becomes difficult to control.

In particular, the point of problem accompanied by such fluctuations in the discharge power is such that, in the case of a construction of the gas laser device, wherein the discharge section is divided into two (or four) as shown in FIG. 2 for reducing the pressure loss, the simultaneous discharge of a plurality of the electrodes is very difficult, which does not make it possible to impart a uniform power to each of the discharge tubes with the consequence that the gas temperature increase becomes non-uniform from one discharge tube to the other.

Figure 4:
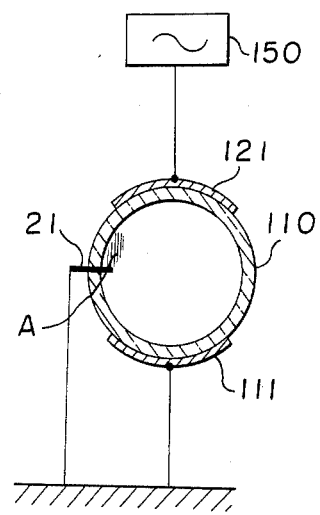
FIGS. 4 and 5 are cross-sectional views showing the main part of the improved silent discharge type gas laser devices.
Figure 5:
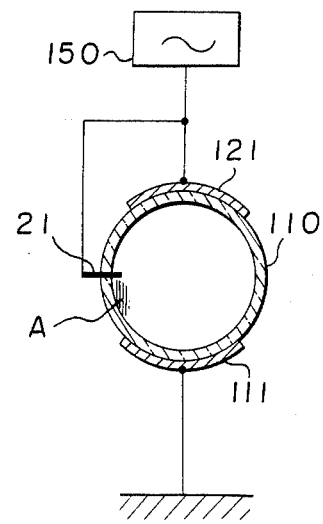
Figure 6:
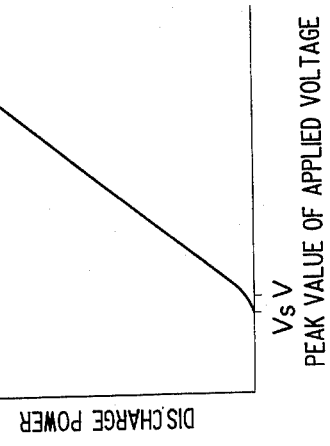
FIG. 6 is a graphical representation showing a relationship between a voltage applied across the electrodes and a discharge power in the improved silent discharge type gas laser devices of FIGS. 4 and 5.

It has often been adopted to provide a trigger discharge section as a means for suppressing an overpotential (fluctuations in the applying voltage) at the start of the discharge. For example, as shown in FIGS. 4 and 5, when a metal piece 21 is provided in the vicinity of the discharge section within the discharge tube, and is grounded or connected with the power source 150, there takes place the trigger discharge (A) as the applying voltage is increased. On account of this, the discharge initiating voltage $V_s$ takes a low voltage value $V_s'$ as shown in FIG. 6. Accordingly, the relationship between the applying voltage and the discharge power becomes smooth as shown in FIG. 6, whereby a favorable result can be obtained with regard to initiation of the discharge.

However, with the construction of providing the metal piece 21 as shown in FIGS. 4 and 5, the trigger discharge (A) disturbs uniformity of the discharge density distribution in the discharge tube, and yet the discharge itself is unstable. On account of this, when the trigger discharge power increases, the laser excitation efficiency decreases. Therefore, the construction of FIGS. 4 and 5 is unable to properly control the trigger discharge power, whereby there would arise a point of problem such that the trigger discharge power becomes greater than the main discharge power, and the laser excitation efficiency decreases considerably.

FIGS. 7A and 7B illustrate the second embodiment of the present invention, in which the abovementioned point of problem is solved. The figures of drawing are respectively a longitudinal cross-sectional view and a cross-sectional view showing the main part of the silent discharge type gas laser device according to the second embodiment of the present invention. In the drawing, reference numerals 21 and 22 are metal pieces to be the trigger electrodes, both being disposed in a gas contraction nozzle 15 at positions upstream side of the gas current from the discharge section, avoiding the laser beam oscillation light path.

Figure 7:
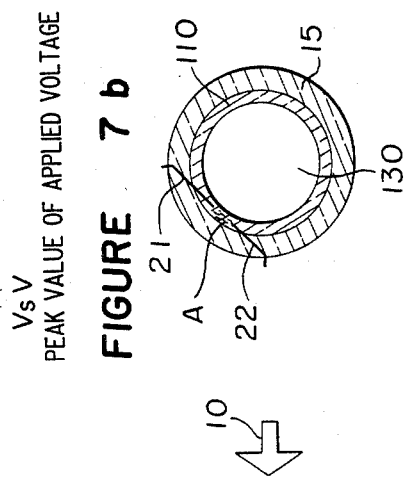
FIGS. 7A and 7B are respectively a schematic longitudinal cross-sectional view showing the main part of the silent discharge type gas laser device according to another embodiment of the present invention, and a schematic cross-sectional view thereof.
Figure 7:
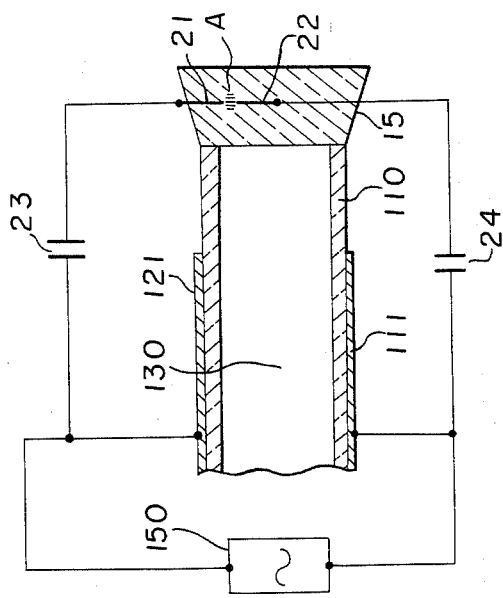
Figure 8:
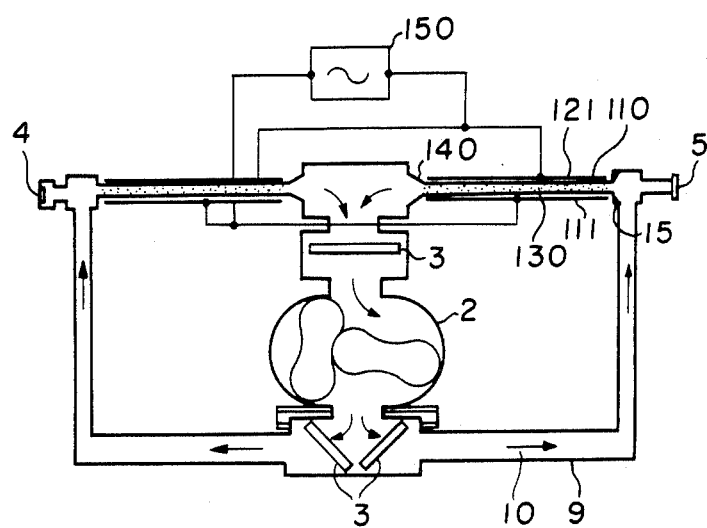
FIG. 8 is a schematic structural diagram of a gas laser device, to which the embodiment shown in FIG. 7 is applied.

The embodiment of FIG. 7 is of such a construction that the gas contraction nozzle 15 is provided, as shown in FIG. 8, in the embodimental construction of the gas laser device shown in FIG. 2. As is apparent from the illustration in FIG. 7, a couple of metal pieces 21 and 22 are positioned in the gas contraction nozzle section 15. Reference numerals 23 and 24 designate capacitors, through which the metal pieces 21 and 22 are respectively connected to one and the same power source 150.

Figure 9:
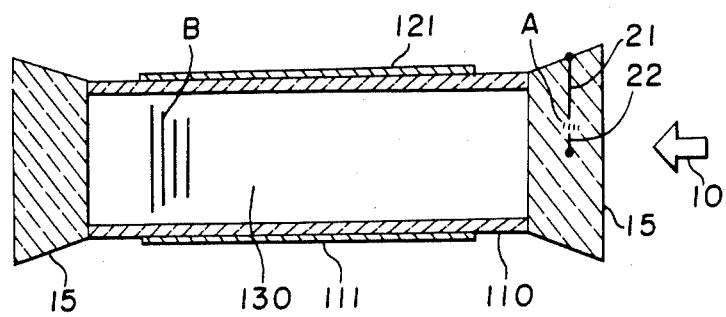
FIG. 9 is a schematic longitudinal cross-sectional view showing the main part of the silent discharge type gas laser device according to still another embodiment of the present invention.

In the device construction of FIGS. 7A and 7B, when a voltage is applied from the high frequency power source 150, the trigger discharge is initiated at the position (A). Subsequently, owing the influence of charged particles generated by the trigger discharge, the main discharge is found to start from a downstream end (B) of the gas current, as shown in FIG. 9. This is the phenomenon peculiar to a high speed axial flow, silent discharge type gas laser device having its gas flow rate of, for example, 100 m/s or more, which is the first discovery made by the present inventors.

According to this second embodiments, the discharge initiation voltage $V_s'$ is reduced to about a half that of a case where no trigger discharge is effected, and the relationship between the applied voltage and the main discharge power is as shown in FIG. 6, hence the metal pieces sufficiently exhibit the function and effect of the trigger electrodes. It has also been confirmed that, by adoption of the same construction as mentioned above in the gas laser device as shown in FIG. 8, the fluctuations in the applying voltage at the start of the discharge in the two discharge tubes disappear.

Further, in the device shown in FIG. 7, the trigger discharge power can be arbitrarily controlled by the capacitors 23 and 24. According to the studies and researches made by the present inventors, it has become apparent that, when the capacitors 23 and 24 are rendered to have their capacitance of about one tenth or less the static capacitance of the main discharge section, they would play a role of the trigger without giving any influence on the laser output.

Figure 10:
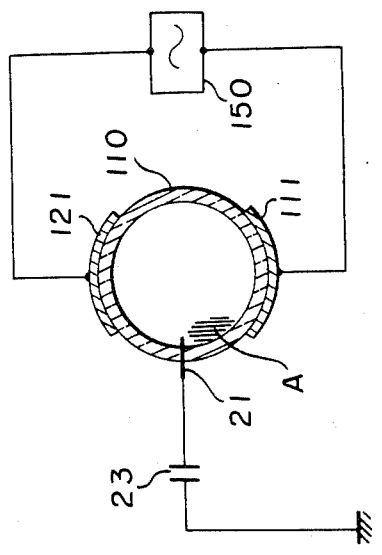
FIG. 10 and 11 are respectively schematic cross-sectional views showing the main part of the silent discharge type gas laser device according to other embodiments of the present invention.
Figure 11:
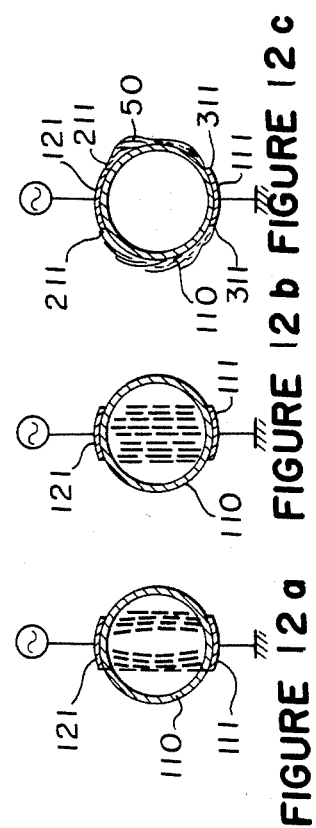

In the above-described second embodiment of the present invention, as set of metal pieces 21 and 22 are connected with the single power source 150 through the respective capacitors 23 and 24. It should, however, be noted that the same effect as that of this embodiment can be exhibited by a construction, as shown in FIG. 10, wherein a set of the metal piece 21 and the capacitor 23 are connected with the power source 150, or, as shown in FIG. 11, wherein both metal piece and capacitor are grounded.

As described in the foregoing, the gas laser device according to this embodiment is provided with metal pieces through a capacitor in the vicinity of the discharge section in the discharge tube, on account of which it exhibits exceedingly good effects such that the discharge initiation voltage can be lowered, and further the main discharge power and the trigger discharge power can be easily controlled. Furthermore, in the gas laser device comprising a plurality of discharge tubes, the fluctuations in the discharge power at the start of the discharge can be effectively made very small.

By the way, it has been made clear as the result of studies by the present inventors that the applying power in the silent discharge is roughly given by the following equation.

$$W = \pi f C_d V_* \sqrt{V_{op}^2 - V_*^2} \quad (1)$$

provided:

$$C_d \approx \frac{1}{2} \epsilon_O \epsilon_S \frac{X_D l}{t}$$

$f$: power source frequency = 100 KHz $\epsilon_O$: dielectric constant of the vacuum = $0.88 \times 10^{-11}$ Fm$^{-1}$ $\epsilon_S$: relative dielectric constant of the dielectric material ~6

$t$: thickness of the dielectric material ~$1 \times 10^{-3}$m $X_D$: breadth of the electrode ~$10 \times 10^{-3}$m $V^*$: discharge voltage ~1 KV $V_{op}$: Zero peak value of the applying voltage ~5 KV $l$: length of discharge tube ~1 m $C_d$: effective capacitance of discharge tube ~$2.64 \times 10^{-10}$F.

Accordingly, in the gas laser device having the above-described parameters, an electric power of 400W or so is imparted for a discharge length of 1 m, and a laser output of about 50W is obtained.

In more detail, in the embodiment shown in FIG. 2, if a glass material such as PYREX (a trademark for a borosilicate glass of Corning Glass Wbrk, U.S.A.) is used as the material for the discharge tube 110, its dielectric constant $\epsilon_S$ is more or less 6, so that it is the only way to rely on increase in the discharge length l in order to increase the applying voltage. From the standpoint of the voltage withstand of the device, there is a practical upper limit in the zero peak value of the applying voltage $V_{op}$; from the aspect of the power source efficiency, there is a practical upper limit in the power source frequency $f$; and further, from the standpoints of the voltage withstand and the strength of the dielectric material, there is a practical lower limit in the thickness $t$ of the dielectric material. For these reasons, it is the only alternative to increase the length of the discharge tube 1 with the consequent difficulty in making the device to be compact in size and obtaining a large laser output.

Therefore, from the above equation (1), it is guessed that use of the dielectric material having a high dielectric constant $\epsilon_S$ for the discharge tube is the most effective for making the gas laser device to be of high output and to be compact in size. However, there have so far been no suggestion at all in the studies and researches made in this field of art about the optimum value of the dielectric constant $\epsilon_S$ or its practical upper limit.

The present inventors repeated experiments on the discharge and the laser oscillation by use of various dielectric materials having different relative dielectric constants, as the result of which they found out the practically suitable conditions for the relative dielectric constant, as will be shown in the following.

Figures 12A, 12B, 12C:
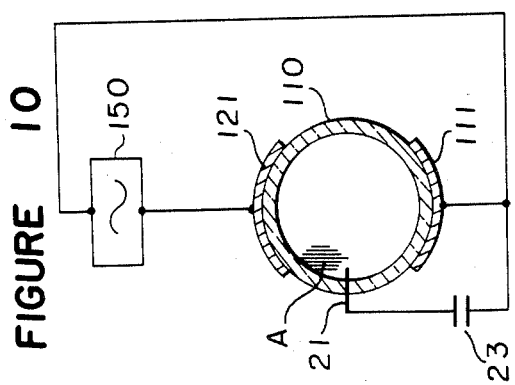
FIGS. 12A, 12B and 12C are respectively cross-sectional views showing the discharge conditions in the discharge tubes constructed with dielectric materials having various relative dielectric constants.

FIGS. 12A, 12B and 12C are cross-sectional views showing different states of discharge in various discharge tubes of different relative dielectric constants, wherein the state of the discharge as observed by naked eyes are broadly classified into three groups of: (a) where $\epsilon_S$ is 10 or lower: (b) where $\epsilon_S$ is 100 or so; and (c) where $\epsilon_S$ is 1000 or higher. In the following, the results of the experiments will be described in detail.

(a) In the case of $\epsilon_S = 3$ (using quartz glass) and $\epsilon_S = 6$ (using borosilicate glass):

This group of the discharge has two defects of a small discharge power density as mentioned in the foregoing, and of the discharge gathering at the end parts of the electrodes, as shown in FIGS. 12A, to cause the center part of the discharge to become "empty". This "empty" discharge phenomenon would affect the shape of the laser beam output, which leads to a disadvantage of the beam shape tending to be easily deformed.

On comparing both cases of $\epsilon_S=3$ and $\epsilon_S=6$, it is seen that the "empty" discharge phenomenon has a tendency of disappearing gradually as the dielectric constant $\epsilon_S$ increases. From the results of the observation, this "empty" discharge phenomenon can be considered to vanish at the dielectric constant of $\epsilon_S=20$.

(b) In the case of $\epsilon_S=60$, $\epsilon_S=120$, and $\epsilon_S=160$ (using titanium oxide):

The discharge power density increases remarkably, and the spatial distribution of the discharge is excellent in uniformity.

According to the embodiments, a laser output of TEM$_{00}$ mode excellent in the symmetry of discharge is obtainable with the following parameters: length of discharge tube l=1 m, thickness of dielectric material t=2 mm, dielectric constant of the dielectric material $\epsilon_S=120$, discharge power W=5 KW, and oscillation output of 0.5 KW.

(c) In the case of $\epsilon_S1200$ and $\epsilon_S=1600$ (using barium titanate):

When an applying voltage is increased to initiate the discharge, the short-circuit discharge 50 on the surface of the dielectric material with the end parts 211, 311 of the electrodes 111, 121 being the starting point of the discharge generates even at a low voltage of several hundred volts with the power source frequency of 100 KHz, and the application of the discharge power is found to be very difficult. This is considered to be due to the fact that, since the dielectric constant $\epsilon_S$ is very high, the dielectric material is brought to a state of near short-circuiting from the standpoint of the alternating current with the consequence that the entire discharge voltage gathers at the end parts 211, 311 of the electrodes.

Suppression of the discharge breakdown to be caused by the end parts 211, 311 of the electrodes is possible to some extent by those expedients such as improvement in the structure of the end part, e.g., elimination of the sharp edge at the end part; covering the end part with an insulating material having a relatively large dielectric constant $\epsilon_S$; and various others. In this case, however, the discharge in the discharge tube still has two disadvantages such that the discharge does not initiate, unless a degree of overpotential ($V_{op}/V*$) is made high, and that the discharge tends to collect at the center part. Incidentally, detailed observation of the cases of $\epsilon_S=1200$ and $\epsilon_S=1600$ reveals that the abovementioned point of problem tends to diminish, as the dielectric constant $\epsilon_S$ becomes smaller and smaller. From the result of observation, it may be guessed that the abovementioned point of problem is substantially eliminated with the dielectric constant $\epsilon_S=800$ or so. Further, the fact that the discharge could be initiated smoothly without augumenting the degree of overpotential ($V_{op}/V*$) in the cases of the abovementioned (a) and (b) is considered due to formation of an electric field distribution which "senses" the end parts of the electrodes 211, 311 as viewed from the side of the discharge tube interior at the start of the initiation, because of the dielectric constant $\epsilon_S$ being not so large, that is, existence of appropriate non-uniformity in the field strength sufficient to start the discharge.

In the above-described embodiments, favourable results could be obtained with the dielectric constant values of from 60 to 160. However, as mentioned in the foregoing, the value of the dielectric constant may sufficiently be in a range of from 20 to 800, from which any suitable value of the dielectric constant $\epsilon_S$ may be selected depending on the power source frequency and the degree of intended output, or availability of the dielectric materials.

The dielectric materials having the value of $\epsilon_S$ ranging from 20 to 800 are such ones, besides titanium oxide, strontium titanate, a mixture of alumina and titanium oxide, and mixture of alumina and strontium titanate.

As described in the foregoing, when a dielectric material having its dielectric constant of from 20 to 800 is used for the discharge tube, the discharge power density can be increased remarkably and stably with the rsult that the gas laser device as a whole can be made compact in size, and the quality of the output beam can be improved.

Although the present invention has so far been described with reference to preferred embodiments thereof, it should be noted that these embodiments are merely illustrative and not so limitative, and that any changes and modifications in the structure of the gas laser device may be effected by those persons skilled in the art without departing from the spirit and scope of the invention as set forth in the appended claims.

We claim:

1. A gas laser device, which comprises in combination:
 (a) a discharge tube made of a dielectric material;
 (b) a laser medium gas which is circulated within said discharge tube in the axial direction thereof;
 (c) an optical resonator composed of mirrors disposed in mutual confrontation at both ends of said discharge tube;
 (d) a p lurality of electrodes provided on radially opposite sides of the outer periphery of said discharge tube; and
 (e) a power source for applying an a.c. voltage to said electrodes to generate silent discharge;
 (f) a metal piece provided in the vicinity of the discharge section and extending through said discharge tube wherein a trigger potential is applied to said metal piece through a capacitor to cause a trigger discharge.

2. A gas laser device according to claim 1, wherein said laser medium gas is circulated at a high speed of 100 m/s or more.

3. A gas laser device according to claim 2, wherein said laser medium gas is circulated by a gas feeding tube connected in the vicinity of both ends of said discharge tube.

4. A gas laser device according to claim 3, wherein said laser medium gas is circulated to both ends of said discharge tube from the substantially center part of said discharge tube through the center part of said gas feeding tube.

5. A gas laser device according to claim 3, wherein said laser medium gas is circulated by a blower.

6. A gas laser device according to claim 5, wherein said laser medium gas is circulated through a heat exchanger.

7. A gas laser device according to claim 1, wherein a voltage is applied from said high frequency power source to said metal piece through a capacitor.

8. A gas laser device according to claim 1, wherein said metal piece is grounded through said capacitor.

9. A gas laser device according to claim 1, wherein said metal piece is disposed upstream of the gas current from the discharge section in said discharge tube.

10. A gas laser device according to claim 1, wherein said metal piece is provided at a position avoiding an oscillating beam path for the laser beam.

11. A gas laser device according to claim 10, wherein said metal piece is provided at a position in contiguity to a gas contraction nozzle for said laser medium gas in said discharge tube.

12. A gas laser device according to claim 11, wherein a pair of metal pieces are oppositely disposed at said gas contraction nozzle part.

13. A gas laser device according to claim 1, wherein the capacitance of said capacitor is made less than one tenth of the static capacitance of said discharge section in said discharge tube.

14. A gas laser device according to claim 1, wherein said discharge tube is made of glass.

15. A gas laser device according to claim 14, wherein said discharge tube is made of Pyrex glass.

16. A gas laser device according to claim 1, wherein said discharge tube is made of ceramic.

17. A gas laser device according to claim 1, wherein said discharge tube is formed in a tubular shape.

18. A gas laser device according to claim 1, wherein said discharge tube is made of a dielectric material having a dielectric constant in a range of from 20 to 800.

19. A gas laser device according to claim 18, wherein said dielectric material is one selected from the group consisting of titanium oxide and strontium titanate.

20. A gas laser device according to claim 18, wherein said dielectric material is one selected from the group consisting of a mixture of alumina and titanium oxide, and a mixture of alumina and strontium titanate.

21. A gas laser device, which comprises in combination;
 (a) a discharge tube made of a dielectric material;
 (b) a laser medium gas which is circulated within said discharge tube in the axial direction thereof;
 (c) an optical resonator composed of mirrors disposed in mutual confrontation at both ends of said discharge tube;
 (d) a pair of electrodes provided on radially opposite sides of the outer periphery of said discharge tube to provide a discharge path passing through the axial line of said tube; and
 (e) a power source for applying an a.c. voltage in a range of 50 Hz–1 MHz to said electrodes to generate silent discharge.

22. A gas laser device according to claim 21, wherein a metal piece is provided in the vicinity of the discharge section in said discharge tube, and a trigger potential is applied to said metal piece through a capacitor.

23. A gas laser device according to claim 22, wherein a voltage is applied from said high frequency power source to said metal piece through a capacitor.

24. A gas laser device according to claim 22, wherein said metal piece is grounded through said capacitor.

25. A gas laser device according to claim 22, wherein said metal piece is disposed upstream of the gas current from the discharge section in said discharge tube.

26. A gas laser device according to claim 22, wherein said metal piece is provided at a position avoiding an oscillating beam path for the laser beam.

27. A gas laser device according to claim 26, wherein said metal piece is provided at a position in contiguity to a gas contraction nozzle for said laser medium gas in said discharge tube.

28. A gas laser device according to claim 27, wherein a pair of metal pieces are oppositely disposed at said gas contraction nozzle part.

29. A gas laser device according to claim 22, wherein the capacitance of said capacitor is made less than one tenth of the static capacitance of said discharge section in said discharge tube.

30. A gas laser device according to claim 21, wherein said discharge tube is made of glass.

31. A gas laser device according to claim 30, wherein said discharge tube is made of Pyrex glass.

32. A gas laser device according to claim 21, wherein said discharge tube is made of ceramic.

33. A gas laser device according to claim 21, wherein said discharge tube is formed in a tubular shape.

34. A gas laser device according to claim 21, wherein said discharge tube is made of a dielectric material having a dielectric constant in a range of from 20 to 800.

35. A gas laser device according to claim 34, wherein said dielectric material is one selected from the group consisting of titanium oxide and strontium titanate.

36. A gas laser device according to claim 34, wherein said dielectric material is one selected from the group consisting of a mixture of alumina and titanium oxide, and a mixture of alumina and strontium titanate.

* * * * *